F. M. JOHNSON.
PLOW STOCK.
APPLICATION FILED OCT. 5, 1911.
1,020,908.
Patented Mar. 19, 1912.
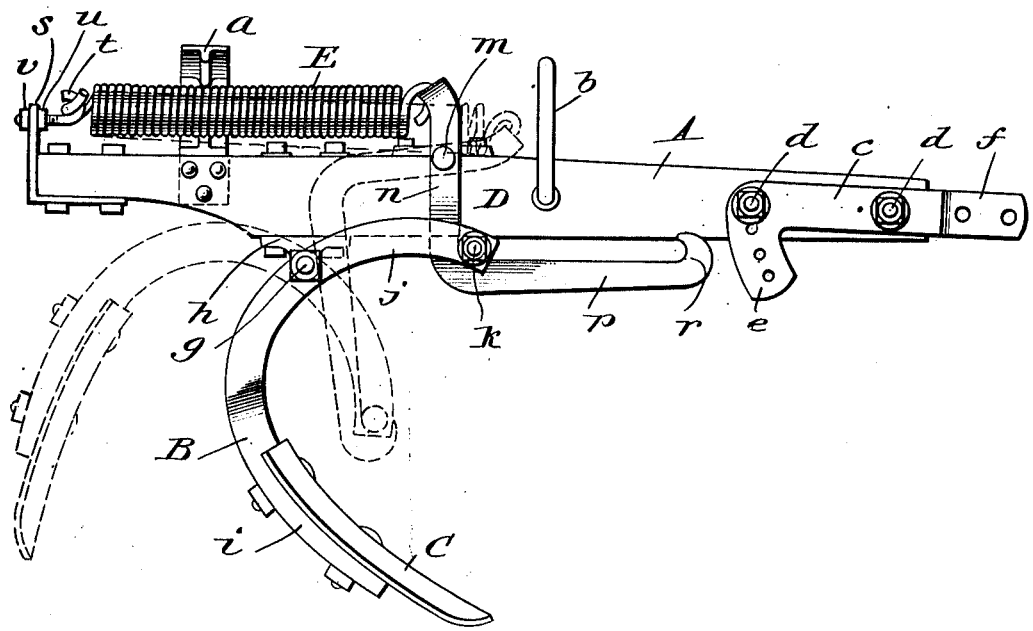
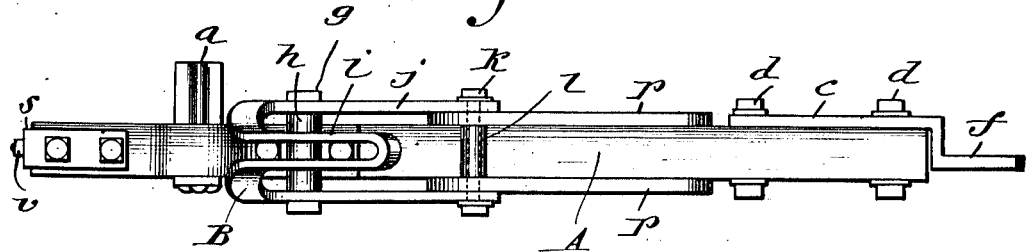
WITNESSES
INVENTOR

UNITED STATES PATENT OFFICE.

FRANCIS M. JOHNSON, OF BOWERSVILLE, GEORGIA.

PLOW-STOCK.

1,020,908.  Specification of Letters Patent.  Patented Mar. 19, 1912.

Application filed October 5, 1911. Serial No. 652,901.

*To all whom it may concern:*

Be it known that I, FRANCIS M. JOHNSON, citizen of the United States, residing at Bowersville, in the county of Hart and State of Georgia, have invented new and useful Improvements in Plow-Stocks, of which the following is a specification.

My present invention has to do with plow stocks such as are constructed with a view to holding plows to their work in a yielding manner; and it consists in the peculiar and advantageous plow stock, hereinafter described and claimed, designed more particularly for use on a wheel cultivator equipped with means for carrying a driver.

In the accompanying drawings which are hereby made a part hereof: Figure 1 is a side elevation of the stock constituting the best practical embodiment of my invention that I have as yet devised; the movable parts being shown by full lines in their normal positions, and by dotted lines in the positions they are caused to assume when the plow share or cultivator blade has brought up against an obstruction in its path and is about ready to clear such obstruction. Fig. 2 is an inverted plan of the stock; the same being shown with the plow share or cultivator blade omitted.

Similar letters of reference designate corresponding parts in both views of the drawings.

The stock body A is preferably, though not necessarily, of wood, and is equipped near its rear end with a foot rest *a* by which the operator manipulates the gangs. At a point adjacent its middle the body A is provided with a loop *b* that is pivoted to its opposite sides and is designed to serve as the medium through which the stock body is suspended from a cultivator frame, not shown. It will also be noted by comparison of the figures that the body A is provided at its forward portion with a draw-bar *c*, fixedly connected to it by transverse bolts *d*, and having a depending apertured portion *e* and also having a forwardly extended apertured portion *f*. The said draw-bar *c* is designed to be attached to a cultivator and regulate the pitch of the plow share or cultivator blades in the ground.

Pivoted through the medium of a transverse bolt *g* to a bearing *h* that is fixed to the under side of the rear portion of the stock body A is a shank B which, in common with the foot rest *a*, loop *b* and draw-bar *c*, is preferably of metal suitable to its purpose. The said shank B is generally curved, and is provided at its lower end with a narrow loop *i*, designed for the connection of a plow share or cultivator blade C, in the manner shown in Fig. 1, or in any other manner consonant with the purpose of my invention. The upper side portions *j* of the said shank B are disposed at opposite sides of the mentioned bearing *h*, and are also disposed at opposite sides of the stock body A. The forward ends of the said side portions *j* are connected by a transverse bolt *k*, and on said bolt is an anti-friction roller *l*; both bolt and anti-friction roller being disposed below the body A as clearly shown in the drawings.

Straddling the body A and pivoted at *m* thereto is a vertically swinging lever D. This lever D comprises a loop portion *n* that extends above and below the body A, and arms *p* that reach forward from the lower ends of the loop *n*, at approximate right angles, and terminate at their forward ends in hooks *r* against which the anti-friction roller *l* is designed to bring up and be stopped.

Disposed above and parallel to the body A is a tractile spring E, the forward end of which is connected to the loop *n* of lever D, and the rear end of which is connected to a support carried at the rear end of the body; the said support comprising by preference a plate *s* fixed to and rising from the body, and a hook *t* having a threaded shank adjustably fixed in the plate *s* through the medium of nuts *u*.

The practical operation of my improved device is as follows: When the plow share or cultivator blade C brings up against an obstruction in its path, the shank B swings to the position shown by dotted lines in Fig. 1 against the action of the spring E exerted through the lever D; the spring and lever at that time assuming the positions shown by dotted lines. Then when the obstruction is cleared by the plow share or cultivator blade, the spring E operates through the lever D to quickly snap the shank B and share or blade C back into the positions shown by full lines in Fig. 1, and to yieldingly retain said elements in said positions.

It will be gathered from the foregoing that the combination shown and described is highly efficient in yieldingly retaining the shank B and share or blade C to their work, and in permitting rearward and upward movement of the share or blade and subsequently snapping back to its working position. It will also be gathered that the combination is at once simple, compact and well adapted to withstand the shocks and strains to which devices of corresponding character are ordinarily subjected.

Having described my invention, what I claim and desire to secure by Letters-Patent, is:

1. The combination of a plow stock body, a bearing fixed to the under side of said body, a curved shank having a narrow loop at its lower end for the connection of a plow share or cultivator blade and also having upper side portions disposed at opposite sides of the body and at opposite sides of said bearing, a transverse bolt extending through the side portions of the shank and the bearing and pivotally connecting the former to the latter, an anti-friction roller connected with and arranged between the forward ends of said side portions and disposed below the body, a lever having a loop that straddles and extends above and below the body and that also has arms extending forward from the lower ends of the loop and terminate in hooks, means pivotally connecting the loop of the lever to the body, and a tractile spring disposed above the body and connected at one end to the loop of the lever and at its opposite end with the body at a point in rear of the lever loop.

2. The combination of a plow stock body, a shank pivotally connected with said body and arranged to swing vertically and having upper side portions and a transverse device disposed between the forward ends of said portions and also disposed under the body, a vertically swinging lever having a loop that straddles and is pivoted to the body and also having arms that extend forward from the ends of the loop and under the said transverse device and are provided at their forward ends with stops, and a tractile spring disposed above the body and connected with the loop of the lever and also connected with the body at a point in rear of said loop.

3. The combination of a plow stock body, a vertically swinging shank pivotally connected therewith and adapted for the connection of a plow share or cultivator blade, a transversely disposed device carried by the upper and forward portion of said shank and arranged under the body, a vertically swinging lever pivotally connected with the body and having a portion that extends above the body and also having a forwardly extending portion disposed below said transversely disposed device and provided with a stop, and a spring connected with said upwardly extending portion of the lever and also connected with the body at a point in rear of said upwardly extending portion.

4. The combination of a plow stock body, a vertically swinging shank pivotally connected therewith and adapted for the connection of a plow share or cultivator blade, a transversely disposed device carried by the upper and forward portion of said shank and arranged under the body, a vertically swinging lever pivotally connected with the body and having a forwardly extending portion disposed below said transversely disposed device and provided with a stop, and a spring connected with said lever and the body.

In testimony whereof I have hereunto set my hand in presence of two subscribing witnesses.

FRANCIS M. JOHNSON.

Witnesses:
ARTRY RANDALL,
S. A. VERNER.